Oct. 29, 1935.  J. H. HENDRIX  2,019,009
COMBINATION UTILITY UTENSIL
Filed Aug. 17, 1933
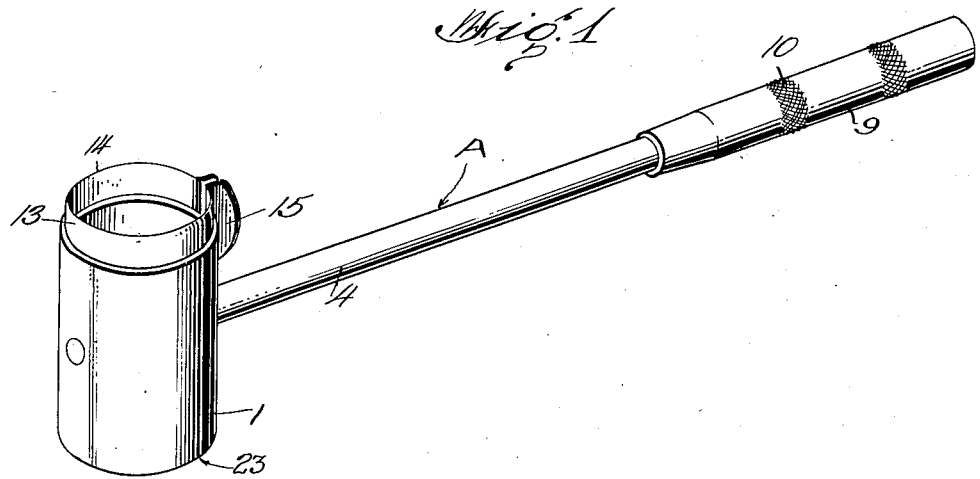
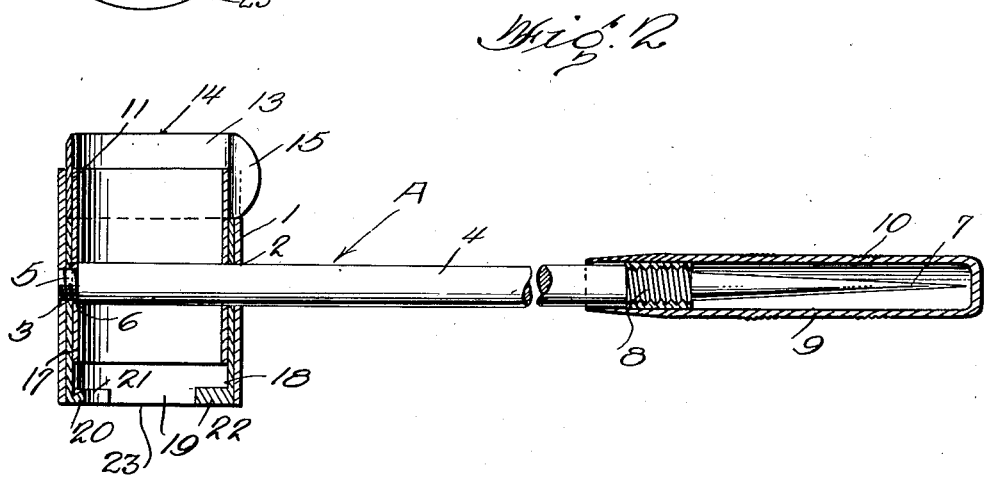
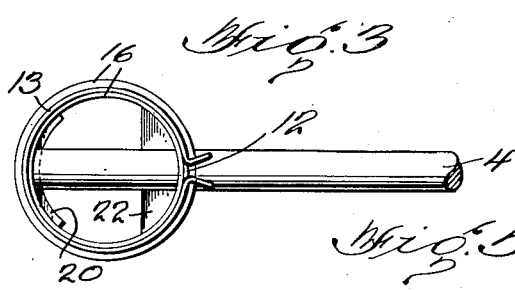
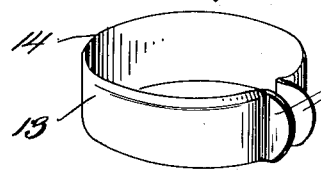
Inventor
Joel Henry Hendrix
By Shreve, Crow & Gordon
Attorneys Patented Oct. 29, 1935

2,019,009

UNITED STATES PATENT OFFICE 2,019,009

COMBINATION UTILITY UTENSIL

Joel Henry Hendrix, New Castle, Pa.

Application August 17, 1933, Serial No. 685,634

4 Claims. (Cl. 17—30)

Generically this invention relates to combination tools but it more especially comprehends a kitchen utensil comprising in combination a meat cutter or tenderer, bottle opener, and ice pick.

One of the principal objects of this invention is the provision of a combination utensil comprising a detachable cutter blade and susceptible of use as a meat tenderer, a bottle opener, a hammer, and an ice pick.

Another important object of this invention is the provision of a combination kitchen utensil comprising a bottle opener, a detachable blade constituting a meat tenderer, a handle terminating at its free end in an ice pick portion, and a detachable guard member adapted to normally encase said ice pick portion and constitute a hand grip for the handle.

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Fig. 1 is a perspective view of my improved combination utensil and illustrating the cutter blade operatively positioned;

Fig. 2 is a longitudinal sectional view of Fig. 1 with the handle and ice pick in elevation;

Fig. 3 is a fragmentary top plan view of Fig. 1;

Fig. 4 is a fragmentary bottom plan of Fig. 1 illustrating the bottle opener; and Fig. 5 is a perspective view of the cutter blade detached from the device.

Heretofore when requiring an ice pick or a bottle opener or a hammer for cracking ice and the like, it has been necessary to look in a number of places to find the respective utensil, and it was to overcome such disadvantages that I combined an ice pick, a bottle opener, and a cutter into a hammer-like combination utensil, which structure enabled the proper mounting and efficient operation of the cutter.

Briefly stated, my invention embodies a combination tool or kitchen utensil including a meat or food cutter and ice pick, designed to prevent injury to the hands during handling of the tool, and also to prevent dulling of the cutting blade and ice pick elements by rendering the blade detachable when not in actual use and by providing a guard for the ice pick adapted to additionally constitute a hand grip for the utensil when the same is not being used as an ice pick.

In the illustrated embodiment characterizing this invention there is shown a combination tool or kitchen utensil A preferably comprising a tubular or mallet-like element 1 formed substantially central of its length with aligned openings 2 and 3, the opening 3 in the present instance being of less diameter than the opening 2.

A handle 4 is constructed from rod steel or any suitable material of a diameter corresponding to opening 2 through which it is adapted to snugly extend, and is formed adjacent its end with a reduced portion 5 and shoulder 6. The portion or section 5 extends through opening 3 and is riveted or otherwise suitably secured with the shoulder 6 engaging the inner wall of said section thereby firmly securing said handle to said section 1. The free end of handle 4 is formed with a tapering section forming an ice pick 7 and at the base of said section 7 said handle is formed with threads 8 for engagement with the complemental internal threads of guard cap 9 adapted to fit over and encase said ice pick. The cap 9 not only protects the ice pick and prevents dulling of the point during normal handling of the utensil A, but at the same time prevents catching of the point and damage to the hands during such handling. In addition, the cap normally constitutes a hand grip for handle 4 and is serrated, knurled, or otherwise roughened on its external surface as at 10.

The body element 1 is formed in one of its end faces with an annular channel 11, the outer wall of which is formed with a slot 12 at a point preferably in alignment with opening 3. A substantially circular clip-like spring blade 13 is formed with a knife or cutting edge 14 and at its free ends with angle ears or finger grips 15 by means of which compression and seating of the blade in channel 11 is effected. The ears 15 are adapted to extend through slot 12 and engage the edges thereof, thereby not only holding the blade firmly in its seat but also preventing rotative movement thereof during the cutting operation. When the blade is operatively positioned the device or utensil is adapted for (what is popularly termed) tendering meat, that is, cutting or separating the tissues of the surface, and the edges of the face of the element 1 on opposite sides of the blade constitute shoulders 16 for limiting the cutting depth of the blade, as will be clear without further discussion. The utensil is also adaptable for chopping vegetables and the like in connection with the preparation of foods, etc.

The end of element 1 opposite to that in which is mounted blade 13 is countersunk as at 17 to form a seat for a metal ring section 18 cut out at its opposite sides as at 19 and formed intermediate said cut out portions with a lateral projection 20 terminating at its free edge in a right-angular projecting lip or catch 21 adapted to engage the edge of a bottle cap when the latter is to be removed, as will hereafter more fully appear. Opposite to said projection 20 and in alignment with opening 2 and slot 12 said ring 18 is formed with or has suitably secured thereto a lateral plate or segmental fulcrum block section 22 adapted to engage said bottle cap, and with said member 20 constitutes a bottle opening means when force is applied downwardly on handle 4. Said sections 20 and 22 are flush with the end face 23 of element 1 and form a continuation thereof adapted to be used hammer-like for cracking ice and the like.

Some of the advantages of having the blade removable are: that it can more easily be cleaned, the cutting edge prevented from becoming dull through the constant handling of the utensil, and damage to the person by the sharp cutting edge prevented when the utensil is being used as a bottle opener or ice pick, and at the same time permitting use of the face of the tool in which the blade is mounted as a hammer for cracking ice and the like.

A further advantage of the utensil is that the guard cap 9 provides a covering for the point of the ice pick and constitutes a hand grip when the device is being used as a meat cutter, bottle opener, or hammer without the danger and annoyance of having the bare point exposed.

While I have preferably shown the element 1 as tubular or barrel-like, it is to be understood that it may be differently constructed, for instance, from a solid material and of different configuration without departing from the spirit of the invention.

From the above it is apparent that I have designed a versatile combination utensil adapted to a variety of uses, embodying unique features, yet simple in construction and design, manufacturable at a minimum of cost, and efficient for the purposes intended.

Although in practice I have found that the form of my invention illustrated in the accompanying drawing and referred to in the above description as the preferred embodiment is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A device of the character described comprising a tubular body section having means in connection with one end adapted to support an annular detachable blade member and said means constituting stop means for limiting the cutting depth of the blade member.

2. A meat tenderer comprising a tubular body section having an annular channel formed in one end of said section, a spring blade detachably mounted in said channel, the end walls surrounding said blade and the bottom of the channel constituting stop means for limiting the cutting depth of said blade.

3. A meat tenderer comprising a tubular body member formed in one end with an annular channel having a cut out portion in one wall thereof, a spring blade frictionally mounted in said channel and formed at its free ends with finger grip means adapted to extend through said cut out portion and engage the edges thereof, whereby the blade is firmly held in its seat and rotative movement thereof during the cutting operation is prevented.

4. A meat tenderer comprising a tubular body member formed in one end with an annular channel having a slot formed in one end the other end being formed at opposite sides with lateral projections flush with and forming a continuation of the end face of said body member, a spring blade having a knife edge detachably mounted in said channel and formed at its ends with ears extending through and seating in said slot in gripping engagement with the edge walls thereof, whereby the blade is normally firmly held in said channel, said ears being operable to effect ready removal of said blade as desired, and means for limiting the cutting depth of said blade.

JOEL HENRY HENDRIX.